United States Patent [19]

Biondi

[11] 3,736,794

[45] June 5, 1973

[54] APPARATUS FOR TESTING DUCTILITY OF SHEETS

[75] Inventor: Frank J. Biondi, Brooklyn, N.Y.

[73] Assignee: The United States of America as represented by the United States Atomic Energy Commission, Washington, D.C.

[22] Filed: Apr. 2, 1946

[21] Appl. No.: 265,894

[52] U.S. Cl. .................................................73/102
[51] Int. Cl. ...............................................G01n 3/26
[58] Field of Search ...................73/87, 94, 102, 37, 73/38, 40, 46, 52

[56] References Cited

UNITED STATES PATENTS

| 1,371,050 | 3/1921  | Olsen ......................................73/87 |
| 1,395,247 | 11/1921 | Abrams ...................................73/38 |
| 1,603,458 | 10/1926 | Guillery ..................................73/87 |
| 2,262,084 | 11/1941 | Alexander .............................73/87 |

Primary Examiner—Samuel Feinberg
Attorney—Roland A. Anderson

[57] ABSTRACT

This invention relates to apparatus for testing the ductility of sheet materials such as sheet metal.

4 Claims, 3 Drawing Figures

INVENTOR
F. J. BIONDI

BY
ATTORNEY

INVENTOR
F. J. BIONDI
BY
ATTORNEY

APPARATUS FOR TESTING DUCTILITY OF SHEETS

Essentially the apparatus in its preferred form comprises two members adapted to clamp therebetween a sheet specimen of the material to be tested. One of the members is provided with means for urging a spherical element against the specimen to be tested sufficiently to crack or rupture the specimen. The other of the members contains a closed chamber, one wall of which is formed by the specimen to be tested, and in which chamber is maintained an air pressure different from that of the atmosphere, preferably a lower pressure. Means for detecting a change in the pressure in the chamber is associated with the member containing the chamber. When the specimen is cracked or ruptured, the pressure in the chamber changes abruptly and the change may be readily detected. Thus is provided a means for easily and accurately detecting when the specimen is cracked or ruptured. By correlating this indication with the amount that the spherical element has deformed the specimen before cracking or rupturing, a measure of the ductility or similar characteristic of the specimen can be obtained.

The construction and operation of the apparatus will be more readily understood from the following discussion in connection with the accompanying drawings in which.

Figure 1:
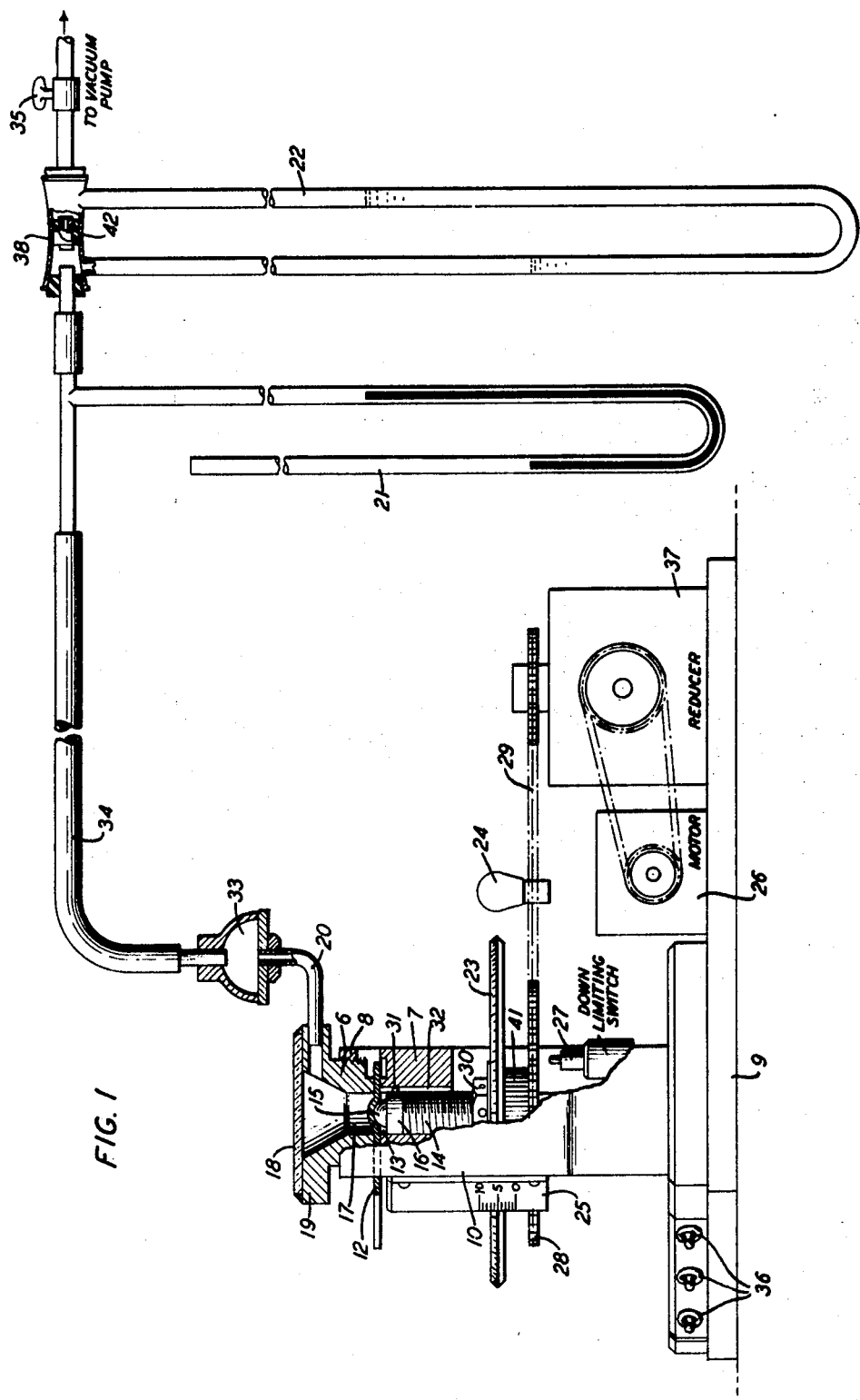
FIG. 1 is a side view of the apparatus, partly shown in section.

Referring to the drawings, a metal vertical member 10 is shown mounted on a suitable base 9. The vertical member 10 is provided with a horizontal slot 11 to receive a test specimen 12. Below the slot 11 is a vertical threaded hole 13 in which is threaded a power-driven rotatable spindle 14, the upper portion of said spindle being provided with a cylindrical element 16. The upper portion 15 of this element 16 has the shape of a half sphere and is adapted to contact specimen 12. The spindle shaft 14 may extend to below the sprocket wheel 28. The apparatus also comprises an upper member 6 threaded in the portion 8 of the base member 10 above the slot 11 and adapted to clamp the specimen against the portion 7 of the base member 10 below slot 11 with an air-tight seal. The upper member 6 is provided with a chamber 17, the upper end of which is closed with some suitable material 18 which may be glass or a transparent plastic materia; the lower end of the chamber is closed by the specimen 12 to be tested. The upper member 6 is screwed down and clamped tightly against the specimen 12 by means of the handle 19.

At the lower end of the spindle shaft 14 is a dial 23 and a sprocket wheel 28. Said sprocket wheel is connected by the chain 29 to the speed reducing apparatus 37 which in turn is connected with the motor 26.

The chamber 17 in said upper member 16 communicates through a tube 20 with a vacuum pump. Said tube is connected through the movable suction cup 33 and through the tube 34 with means for indicating the pressure in the chamber 17 and means for indicating the rate of flow of air into the chamber. Such means may comprise an open-end mercury manometer 21 and a capillary type flow meter 22.

At the beginning of the operation before the specimen 12 is placed in the device the element 15 is set so that its top level will be just beneath the specimen 12 when the latter is inserted. This is done by turning on the motor 26 and allowing the spindle 14 to rise in the threaded hole 13 until the top of the element 15 has just reached the level of the slot 11, whereupon the motor is turned off. The position of the element 15 may be observed by looking through the transparent disc 18. If desired, during the adjustment of the element 15, a glass slide may be inserted in the slot 11 in place of the specimen 12. If the element 15 is pushed beyond the level of the slot 11, the glass slide will crack.

After setting the element 15 in position it is desirable to arrange the scale 25 and the dial 23 so that they read zero revolutions. This may be done by loosening the screws 40 in the scale 25 and sliding the scale through the slot 39 until the dial 23 is just level with the zero mark on the scale 25. The dial 23 may then be set at its zero point by loosening the nut 30 which disengages the dial from the spindle shaft 14 so that the dial may be rotated around the shaft in any direction. When the dial has been set so that its zero point corresponds with the zero point on the scale 25, the nut 30 is tightened again so that the dial is held firmly against the spindle shaft 14 between the nut 30 and the block 41, said block being a support for the dial.

Figure 2:
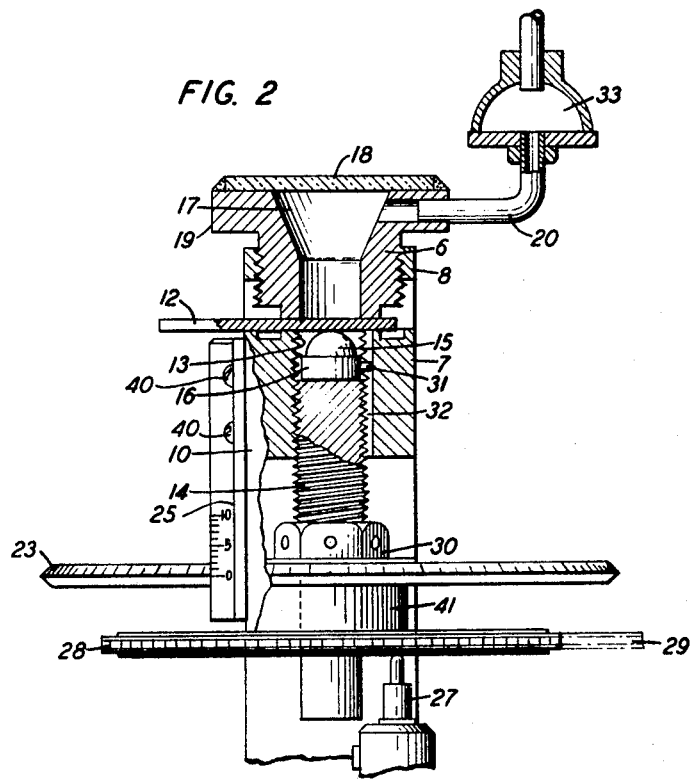
FIG. 2 is an enlarged view partly in section of the specimen rupturing mechanism of FIG. 1.
Figure 3:
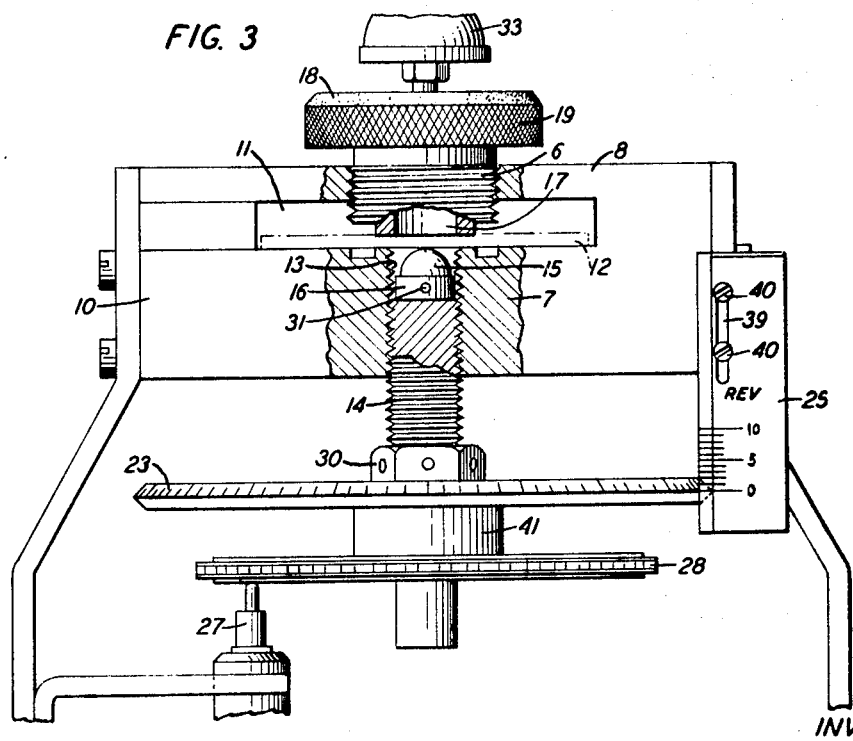
FIG. 3 is similar to FIG. 2 except the view is taken from a different angle.

The specimen 12 is now inserted into the slot 11 and is clamped in place by turning the handle 19. The appearance of the specimen at this point is as shown in FIG. 2. The vacuum pump (not shown in the drawings) is then started after which the motor 26 is turned on, which causes the spindle shaft carrying the element 15 to move upward so that the element 15 is pushed against the specimen 12. When the limit of the ductility of the specimen 12 is reached, the specimen ruptures and has the appearance of the specimen shown in FIG. 1. At this point the motor 26 is turned off causing the spindle shaft 14 to stop moving.

While the spindle 14 is being pushed upwards, a negative pressure is maintained in the chamber 17 by means of a vacuum pump; if the specimen is porous as in the case when slightly porous materials are being tested, air passes through the specimen at a constant rate while a negative pressure is maintained in the chamber. When the spherical element 15 carried by the spindle 14 cracks or ruptures the specimen 12, the rate of flow of air into and from the chamber 17 is changed, and the pressure therein is changed. The air rushing into the chamber 17, because of the rupture in the specimen 12, causes a sudden movement of the liquid in the manometer 21 which may be readily detected by the eye. This movement of the liquid in the manometer is the signal for the motor to be turned off. The rate of flow of the air into the chamber 17 may be determined by the rate of the movement of the liquid in the capillary flow meter 22. Any suitable liquid such as mercury, oil, or water may be used in the manometer and the flow meter.

The tube 38 contains a capillary member 42 which allows the air passing through the system to enter the flow meter 22 slowly, so that the rate of flow of air into the system may be determined.

Since the spindle shaft 14 and the dial 23 are attached to one another so that they move as one unit, the dial 23 will make one revolution for each revolution made by the spindle shaft. The number of complete revolutions made may be read from the scale 25 while the fractional parts of revolutions may be read from the dial 23 which is marked to read to one hundredth of a revolution. The number of revolutions made is an indication of the force necessary to apply to the element 15 to cause it to rupture the specimen 12. Thus the number of revolutions made by dial 23 from the zero point to the point where the specimen ruptures gives an indication of the ductility of the specimen.

The element 15 is shown in the drawings as a sphere but it may be made in other shapes, such as a pyramid or an oval; the shape used depends on the test to be made. If a sphere-shaped element is used, it may be of any suitable size; a sphere with a fairly large diameter is preferred for a brittle specimen, while a small sphere is preferred for more ductile specimens. In general it is preferable to relate the element 15 to the spindle 14 in such a way that the element will not rotate as the spindle 14 is moved upward.

If the element 15 is rotated with the spindle 14, the force exerted on the specimen 12 would be partly a rotational force rather than a force due to the upward thrust of the element 15. One way to prevent the element 15 from rotating is to form the element as an integral part of a cylinder 16, with the cylinder 16 resting freely on the top of spindle 14. To keep the cylinder 16 in place a pin 31 may be inserted into a cavity of the cylinder. The pin 31 travels up and down in a vertical groove 32 in the casing 10 as the spindle moves up and down in the hole 13.

Materials of a wide range of ductility may be tested by this device, such as the most ductile materials or materials which are so brittle as to be difficult to handle. Since the clamping members 6 and 7 determine the area tested no special preparation of the edges of a sample must be made to avoid cracks or imperfections as is necessary in tensile strength or elongation testing.

In the illustrated apparatus the dial 23 may consist of two discs of transparent methylmethacrylate with ground beveled edges having a piece of black paper sandwiched between them. The dial is edge lighted by lamp 24 as it moves, and the light is transmitted by the synthetic resin to give a sharply contrasted, easily read black line at the periphery. A vertical scale 25 records the number of revolutions made by the dial 23. The dial itself may be marked to read to one-hundredth of a revolution. When the motor 26 is reversed to lower the spindle 14, at about the time the dial 23 reaches the zero position, the sprocket wheel 28 is engaged by a plunger type switch 27 which disconnects the motor 26 from its source of power. The switches 36 are used to control the motor 26 and the lamp 24.

This invention is particularly adapted for testing the ductility of porous metal sheets of such porosity that they are capable of use as barriers for the separation by diffusion of gases from mixtures of gases, where the gases in the mixture pass through the pores primarily by molecular or diffusive flow as distinguished from plain or viscous flow.

Various modifications may be made in the illustrated apparatus, and the apparatus is susceptible of use for other purposes. Materials such as paper or plastic sheets and films as well as materials may be tested by this apparatus.

What is claimed is:

1. An apparatus for testing ductility comprising two members adapted to clamp a piece of material therebetween, one of said members having a closed chamber therein one wall of which is formed by the specimen being tested, an element associated with the other member for deforming the specimen, means for measuring the movement of said element, means for maintaining in said chamber a pressure different from that of the atmosphere, and means for detecting a change in said pressure due to cracking of said specimen when it cracks because of deformation by said element.

2. An apparatus for detecting the ductility of material in sheet form comprising two members adapted to clamp a sheet of material therebetween, one of said members having a closed chamber therein one wall of which is formed by the specimen being tested, an element associated with the other member for deforming the specimen, means for measuring the movement of said element, means for maintaining in said chamber a pressure lower than that of the atmosphere, and means for detecting a change in said pressure due to cracking of said specimen when it cracks because of deformation by said element.

3. An apparatus for detecting the ductility of material in sheet form comprising two members adapted to clamp a sheet of material therebetween, one of said members having a closed chamber therein one wall of which is formed by the specimen being tested, an element associated with the other member for deforming the specimen, means for measuring the movement of said element, means for maintaining in said chamber a pressure different from that of the atmosphere, means for detecting a change in said pressure due to cracking of said specimen, said means comprising a manometer, and means for detecting the rate of flow of gas through the deformed specimen, said means comprising a flow meter.

4. An apparatus for detecting the ductility of material in sheet form comprising two members adapted to clamp a sheet of material therebetween, one of said members having a closed chamber therein one wall of which is formed by the specimen being tested, the other of said members comprising a spindle placed in an aperture, said spindle being capable of moving to and fro in said aperture, an element for deforming the specimen associated with said spindle, said element adapted to be thrust against said specimen until said specimen ruptures, means for measuring the movement of said element, means for maintaining in said chamber a pressure different from that of the atmosphere, and means for detecting a change in said pressure due to cracking of said specimen.

* * * * *